United States Patent
Carlsten et al.

(10) Patent No.: US 11,858,220 B2
(45) Date of Patent: Jan. 2, 2024

(54) COUPLING POLYMERIC COMPONENTS TO ONE ANOTHER UTILIZING ELECTROMAGNETIC ENERGY

(71) Applicant: Raytheon Company, Waltham, MA (US)

(72) Inventors: Curtis B. Carlsten, Seekonk, MA (US); Peter Willey, Rumford, RI (US); Stephanie Gratiano, Bristol, RI (US); John Carcone, Portsmouth, RI (US)

(73) Assignee: Raytheon Company, Tewksbury, MA (US)

( * ) Notice: Subject to any disclaimer, the term of this patent is extended or adjusted under 35 U.S.C. 154(b) by 44 days.

(21) Appl. No.: 17/329,092

(22) Filed: May 24, 2021

(65) Prior Publication Data

US 2022/0024146 A1 Jan. 27, 2022

Related U.S. Application Data

(60) Provisional application No. 63/057,204, filed on Jul. 27, 2020.

(51) Int. Cl.
*B29C 65/36* (2006.01)
*H02G 15/10* (2006.01)

(52) U.S. Cl.
CPC ......... *B29C 65/3624* (2013.01); *H02G 15/10* (2013.01)

(58) Field of Classification Search
CPC .. H02G 15/10; B29C 65/3668; B29C 65/3632
See application file for complete search history.

(56) References Cited

U.S. PATENT DOCUMENTS

| | | | |
|---|---|---|---|
| 4,090,899 A * | 5/1978 | Reich | B29C 66/112 |
| | | | 285/21.2 |
| 4,521,642 A | 6/1985 | Vives | |
| 5,037,177 A | 8/1991 | Brown et al. | |
| 5,048,921 A | 9/1991 | Jones et al. | |
| 5,710,413 A * | 1/1998 | King | B29C 65/3612 |
| | | | 156/272.4 |
| 8,328,431 B2 | 12/2012 | Kordahi et al. | |
| 2011/0188803 A1 | 8/2011 | Kordahi et al. | |
| 2016/0151965 A1* | 6/2016 | Carlsten | F16B 11/008 |
| | | | 156/275.7 |

FOREIGN PATENT DOCUMENTS

| | | |
|---|---|---|
| EP | 0304476 B1 | 10/1991 |
| FR | 1146342 A | 11/1957 |
| WO | WO 2020/068394 A1 | 4/2020 |

OTHER PUBLICATIONS

International Search Report for International Application No. PCT/US2021/035021 dated Sep. 16, 2021, 13 pages.

* cited by examiner

*Primary Examiner* — Daniel McNally

(57) ABSTRACT

A method of coupling polymeric components utilizing electromagnetic energy is disclosed. The method can include obtaining a first component having a first coupling portion, a second component having a second coupling portion, and a susceptor. The method can also include mating the first and second components such that the susceptor is proximate the first and second coupling portions. In addition, the method can include applying electromagnetic energy to the susceptor. The susceptor can convert the electromagnetic energy to heat, which can melt portions of the first and second coupling portions about the susceptor to couple the first and second components to one another upon solidification.

13 Claims, 5 Drawing Sheets

COUPLING POLYMERIC COMPONENTS TO ONE ANOTHER UTILIZING ELECTROMAGNETIC ENERGY

RELATED APPLICATIONS

This application claims the benefit of U.S. Provisional Application Ser. No. 63/057,204, filed Jul. 27, 2020, and entitled, "Coupling Polymeric Components to One Another Utilizing Electromagnetic Energy," which is incorporated by reference in its entirety herein.

BACKGROUND

Splicing or joining of undersea cable systems (e.g., for telecommunication, surveillance, etc.) typically requires the encapsulation of protective housings over the spliced cable joints with polyethylene (PE) in order to achieve long term life in seawater. Expensive molds are typically utilized for forming the PE encapsulations and these molding processes can be time consuming. Sub-sea cable splice interconnections are commonly made in the field. Thus, a significant investment in time and money is often required in order to achieve a high-strength durable undersea cable joint with a PE housing overmold.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
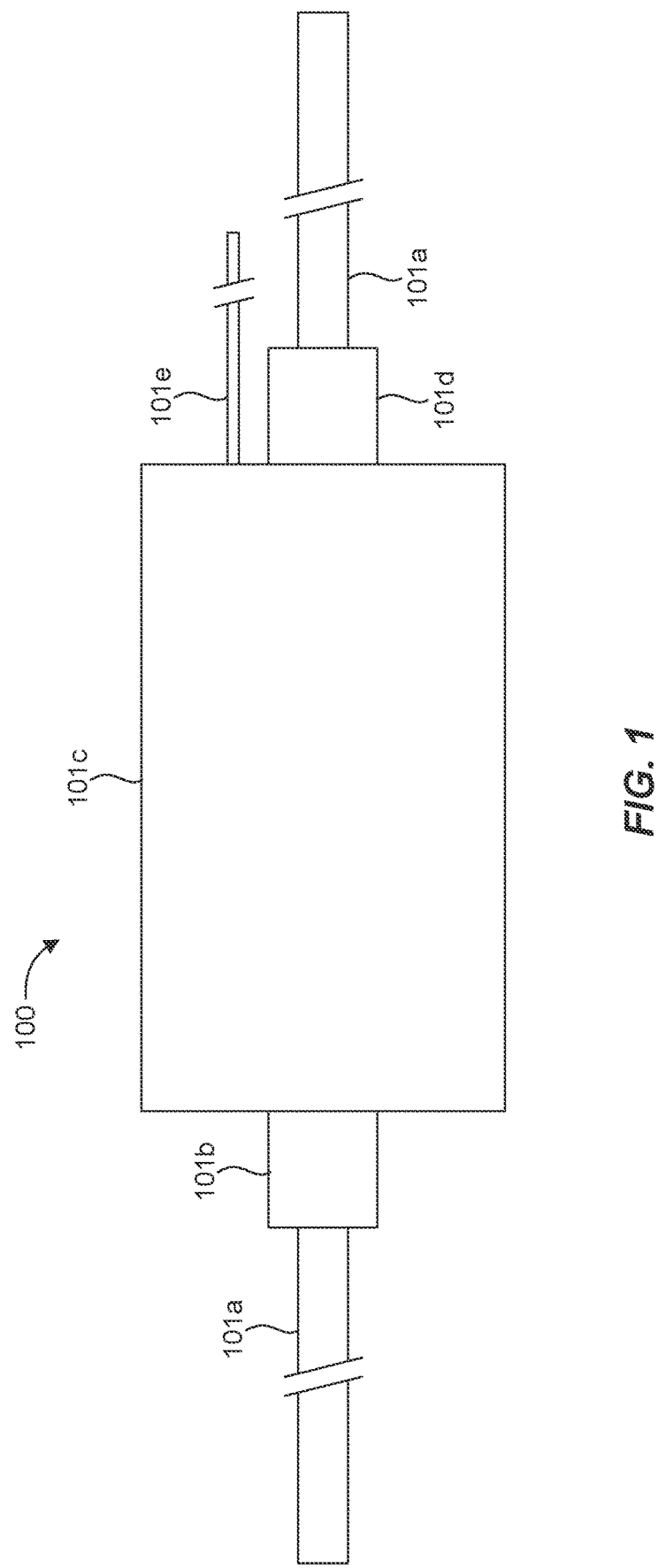
FIG. 1 is an illustration of a component assembly in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although the traditional PE overmold approach for protecting undersea cable junctions is effective, this technique is commonly performed in the field and is time consuming and expensive. Alternatives to the PE overmold do exist, such as utilizing a metal pressure vessel with O-ring seals, however, reliability is an issue. Thus, there is a need for a PE protective housing for undersea cable junctions that can be formed reliably, more quickly, and at less expense than the traditional PE overmold approach.

Accordingly, a method of coupling polymeric components utilizing electromagnetic energy is disclosed that can quickly provide reliable and watertight joints. The method can include obtaining a first component having a first coupling portion, a second component having a second coupling portion, and a susceptor. The method can also include mating the first and second components such that the susceptor is proximate the first and second coupling portions. In addition, the method can include applying electromagnetic energy to the susceptor. The susceptor can convert the electromagnetic energy to heat, which can melt portions of the first and second coupling portions about the susceptor to couple the first and second components to one another upon solidification.

In one aspect, a polymeric component assembly is disclosed. The polymeric component assembly can include a first component having a first coupling portion. The component assembly can also include a second component having a second coupling portion. Additionally, the component assembly can include a susceptor proximate the first and second coupling portions. The susceptor can be operable to convert electromagnetic energy to heat sufficient to melt the first and second coupling portions. A solidified portion of the first and second coupling portions about the susceptor can couple the first and second components to one another.

In one aspect, a polymeric protective housing for a cable junction is disclosed. The protective housing can include a cable having a first coupling portion. The protective housing can also include an end cap having second and third coupling portions. The protective housing can further include a shell having a fourth coupling portion. The protective housing can still further include a first susceptor proximate the first and second coupling portions. The first susceptor can be operable to convert electromagnetic energy to heat sufficient to melt the first and second coupling portions. In addition, the protective housing can include a second susceptor proximate the third and fourth coupling portions. The second susceptor can be operable to convert electromagnetic energy to heat sufficient to melt the third and fourth coupling portions. A solidified portion of the first and second coupling portions about the first susceptor can couple the cable and the end cap to one another. A solidified portion of the third and fourth coupling portions about the second susceptor can couple the end cap and the shell to one another.

Figure 2A:
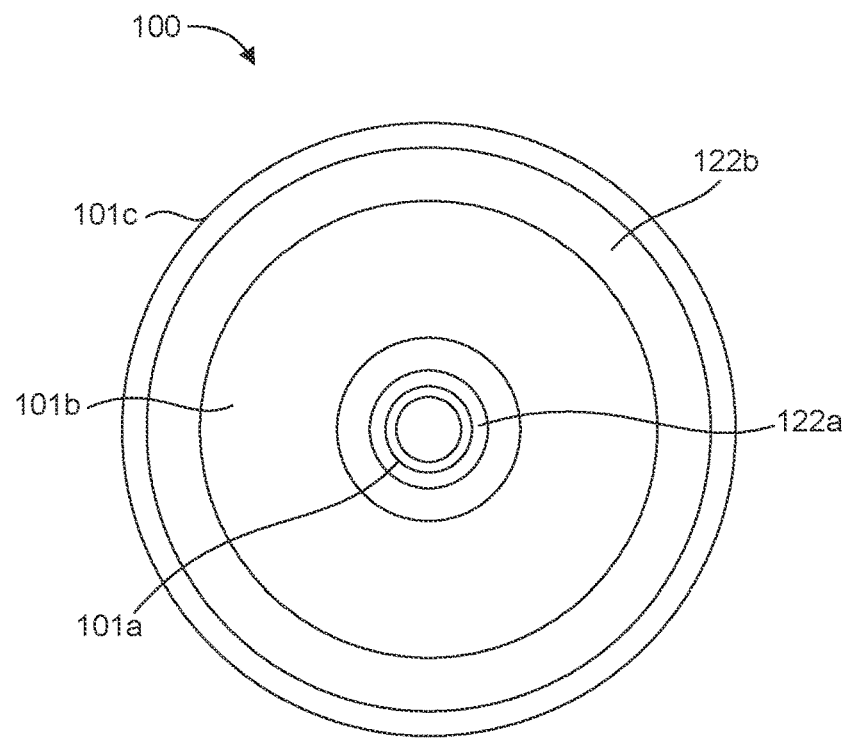
FIGS. 2A and 2B are end views of the component assembly of FIG. 1, in accordance with an example of the present disclosure.
Figure 2B:
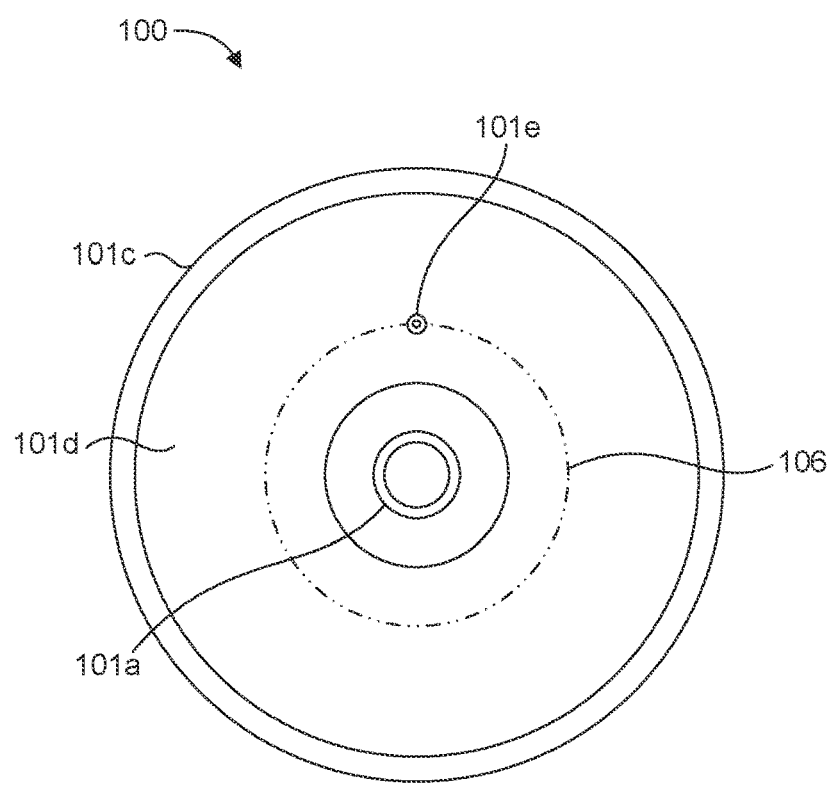
Figure 3:
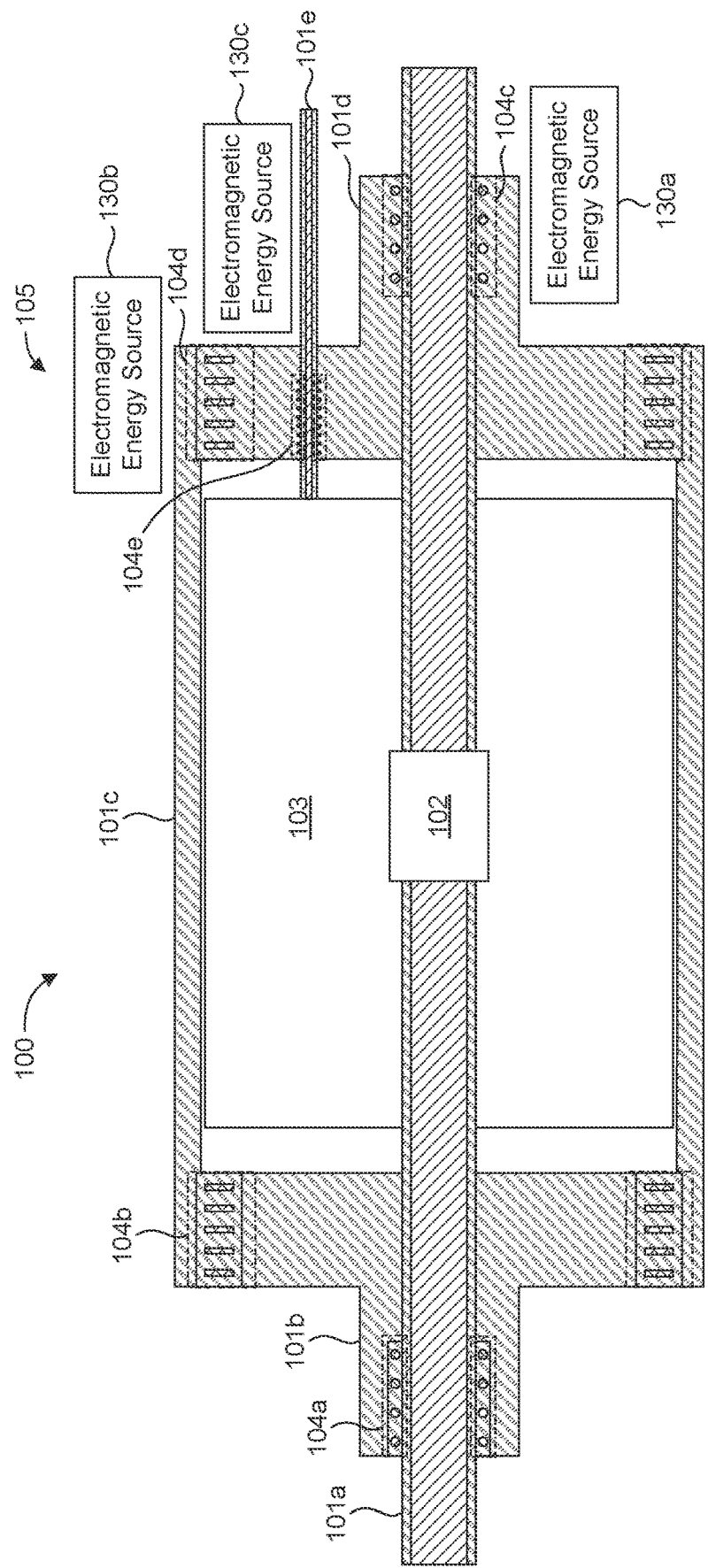
FIG. 3 is a side cross-sectional view of the component assembly of FIG. 1, in accordance with an example of the present disclosure.

One example of a polymeric component assembly 100 is illustrated in FIGS. 1-3. FIG. 1 shows a side view of the component assembly 100. End views of the component assembly 100 are shown in FIGS. 2A and 2B. In general, the component assembly 100 can comprise components 101*a-e* coupled to one another, although any suitable number of components can be included in such an assembly. As described in more detail below, the components 101*a-e* can be coupled by welding or fusing utilizing electromagnetic energy (e.g., induction heating) and embedded susceptors to assist in localized heat generation.

In one aspect, the components 101*a-e* of the component assembly 100 can form at least a portion of a cable (e.g., a data cable, a telecommunications cable, a power cable, etc.)

and/or a protective housing for a cable junction, as shown. Although the present technology will be discussed in the context of cables and protective housings for cable joints, it should be recognized that the component assembly and principles disclosed herein can be utilized in any suitable device, mechanism, or technology area, such as undersea acoustic surveillance, undersea power grids, telecommunication systems, oil and gas industry, oceanographic applications, terrestrial sealing technology, etc. In addition to these examples, those skilled in the art will recognize the many different applications that this technology can be applied to, and that the examples identified herein are not meant to be limiting in any way. Essentially, those skilled in the art will recognize that the present invention technology can be applied in a variety of disciplines and to a variety of applications where components, typically constructed of polymeric materials, are to be coupled to one another.

In the side cross-sectional view of the component assembly 100 shown in FIG. 3, this example illustrates segments of a cable (identified as component 101a) joined at 102. The cable 101a can be any suitable type of cable known in the art (e.g., a data cable, a power cable, etc.) and can be of any suitable construction or configuration. The joining or junction of cable segments can be accomplished using any suitable device or structure and by any suitable technique or process known in the art. The components 101b-d can be configured to provide a suitable housing or protective barrier for the cable junction 102. In some examples, the components 101b-d can at least partially form a pressure boundary (e.g., pressure vessel) about the cable junction 102, such as for use in underwater applications. In some examples, the component 101e (e.g., a "feedthrough") can be included to provide communication and/or power through the protective housing or barrier formed by the components 101b-d to a device 103 (e.g., an electronic device) located within the protective housing or barrier. Although only a single component 101e is illustrated, it should be recognized that any suitable number of such components can be included, such as distributed about the component 101d on a circular pattern 106 (FIG. 2B). Any of the components 101a-e can therefore form at least a portion of a cable assembly or a protective housing for a cable junction as illustrated in the figures.

Figure 4A:
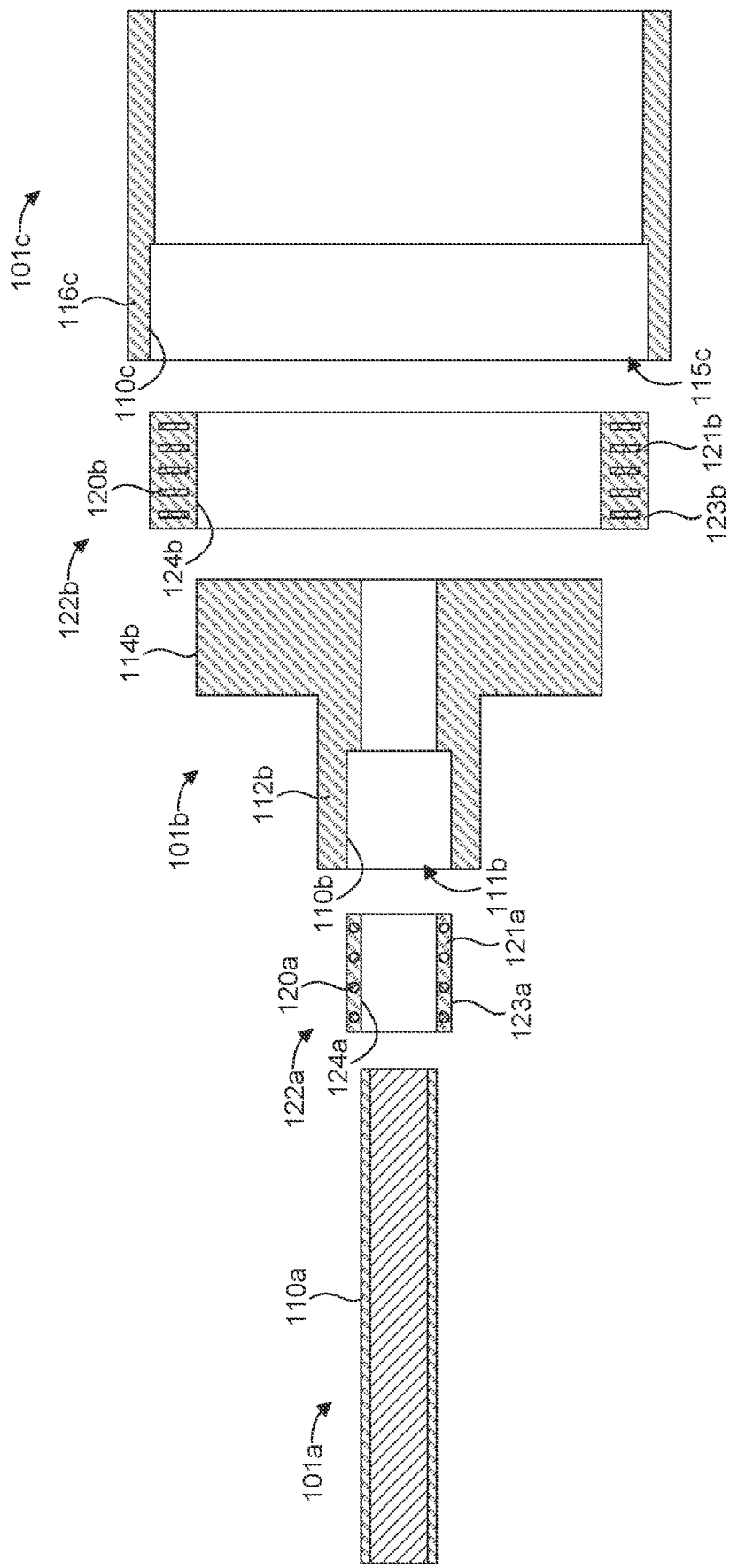
FIGS. 4A and 4B are detailed, exploded cross-sectional views of opposite ends of the component assembly shown FIG. 3.

As shown in the exploded cross-section view of FIG. 4A, component 101a (e.g., a cable) and 101b include features that can be utilized or configured to facilitate coupling with one another. For example, the component 101a can have a coupling portion 110a, which in the example of the component 101a being a cable can be any suitable portion of the outer surface of the cable (e.g., a cable jacket). The component 101b (e.g., an end cap in the illustrated example) can have a coupling portion 110b configured to mate, interface, or otherwise facilitate coupling the component 101b with the outer surface coupling portion 110a of the component 101a. The coupling portion 110b can include an opening 111b formed in and defined by a flange 112b. In one aspect, the outer surface coupling portion 110a of the component 101a can be configured to fit within the opening 111b of the coupling portion 110b of the component 101b. Stated differently, the opening 111b can be configured to receive the outer surface coupling portion 110a of the component 101a. In this case, the component 101a, or in this example the cable, extends through the component 101b, or in this example the end cap. In the illustrated example, the coupling portions 110a, 110b each have a cylindrical configuration, although this is not intended to be limiting, as any suitable configuration or geometry can be utilized.

The component assembly 100 can also include one or more susceptors 120a proximate the coupling portions 110a, 110b (e.g., embedded close to the joint interface). The susceptors 120a can be operable to convert electromagnetic energy (e.g., radio frequency (RF), magnetic fields, etc.) to heat sufficient to melt and fuse the coupling portions 110a, 110b at the joint interface, such that a solidified portion or region (indicated at 104a in FIG. 3) of the coupling portions 110a, 110b about the susceptor 120a couples the components 101a, 101b to one another. In other words, the susceptor 120a can be heated by its presence in (i.e., being exposed to) an electromagnetic field (i.e., by absorbing electromagnetic energy) and can transfer heat to the surrounding coupling portions 110a, 110b by thermal conduction and/or radiation to melt the coupling portions 110a, 110b, causing at least a portion of the material of the coupling portions 110a, 110b to weld or fuse together to form a localized welded or fused region. This can form a strong, contiguous bond (e.g., polymer chains mix and link between components) coupling the components 101a, 101b to one another. The susceptor 120a can therefore provide internal heat generation for melting the coupling portions 110a, 110b.

In one aspect, the components 101a, 101b are welded or "fused" directly to one another, which prevents separation of the components 101a, 101b without causing their destruction. In other words, it is the materials proximate the susceptors that melt and diffuse into one another to secure the components 101a, 101b to one another, thus creating a permanent and irreversible bond between the components. By joining the components 101a, 101b in this manner, in which the components themselves are melted to "fuse" or secure one component to another, the components may therefore not be separated without damaging or destroying the parts, unlike other joining processes (i.e., adhesives) in which the components remain essentially intact and are adhered to another by an intermediary material.

Additionally, the manufacturing processes utilized to produce the components may provide suitably smooth surface finishes (e.g., devoid of substantial surface irregularities) that facilitate directly fusing the components to one another. For example, it is desirable that the joint interface geometry is true and parallel with no substantial surface irregularities.

In some examples, such as the example illustrated in FIGS. 3 and 4A, the susceptor 120a can be at least partially surrounded by or encapsulated (e.g., molded) in a weld material 121a to form a susceptor grommet 122a disposed between the coupling portions 110a, 110b. In this case, an outer interface surface 123a of the susceptor grommet 122a can be configured to interface with the coupling portion 110b of the component 101b, and an inner surface 124a of the susceptor grommet 122a can be configured to interface with the coupling portion 110a of the component 101a. In this example, therefore, the coupling portion 110b is not configured to interface directly with the outer surface coupling portion 110a of the cable 101a. In one aspect, during assembly, the susceptor grommet 122a containing the susceptor 120a can be disposed proximate a coupling portion, such as coupling portion 110b, prior to inserting the coupling portion 110a into the opening 111b.

The components 101b, 101c can also include features that can be utilized or configured to facilitate coupling with one another. For example, the component 101b (in this example the end cap) can have a coupling portion 114b. The component 101c (e.g., a shell or tube in the illustrated example) can have a coupling portion 110c configured to mate, interface, or otherwise facilitate coupling with the coupling portion 114b of the component 101b for coupling the component 101b and the component 101c to one another. The coupling portion 110c can include an opening 115c formed in and defined by a flange 116c of the component 101c. In one aspect, the coupling portion 114b of the component 101b can be configured to fit within the opening 115c. Stated differently, the opening 115c can be configured to receive the coupling portion 114b of the component 101b. In the illustrated example, the coupling portions 114b, 110c each have a cylindrical configuration, although this is not intended to be limiting, as any suitable configuration or geometry can be utilized.

The component assembly 100 can also include one or more susceptors 120b proximate the coupling portions 114b, 110c (e.g., embedded close to the joint interface). As described above, the susceptors 120b can be operable to convert electromagnetic energy (e.g., radio frequency (RF), magnetic fields, etc.) to heat sufficient to melt the coupling portions 114b, 110c at the joint interface, such that a solidified portion (indicated at 104b in FIG. 3) of the coupling portions 114b, 110c about the susceptor 120b couples the components 101b, 101c to one another.

In some examples, such as the example illustrated in FIGS. 3 and 4A, the susceptor 120b can be at least partially surrounded by or encapsulated (e.g., molded) in a weld material 121b to form a susceptor grommet 122b disposed between the coupling portions 114b, 110c. In this case, an outer interface surface 123b of the susceptor grommet 122b can be configured to interface with the coupling portion 110c of component 101c, and an inner surface 124b of the susceptor grommet 122b can be configured to interface with the coupling portion 114b of the component 101b. In this example, therefore, the coupling portion 110c is not configured to interface directly with the coupling portion 114b. In one aspect, during assembly, the susceptor grommet 122b can be disposed proximate a coupling portion, such as coupling portion 110c, prior to inserting the coupling portion 114b into the opening 115c.

Figure 4B:
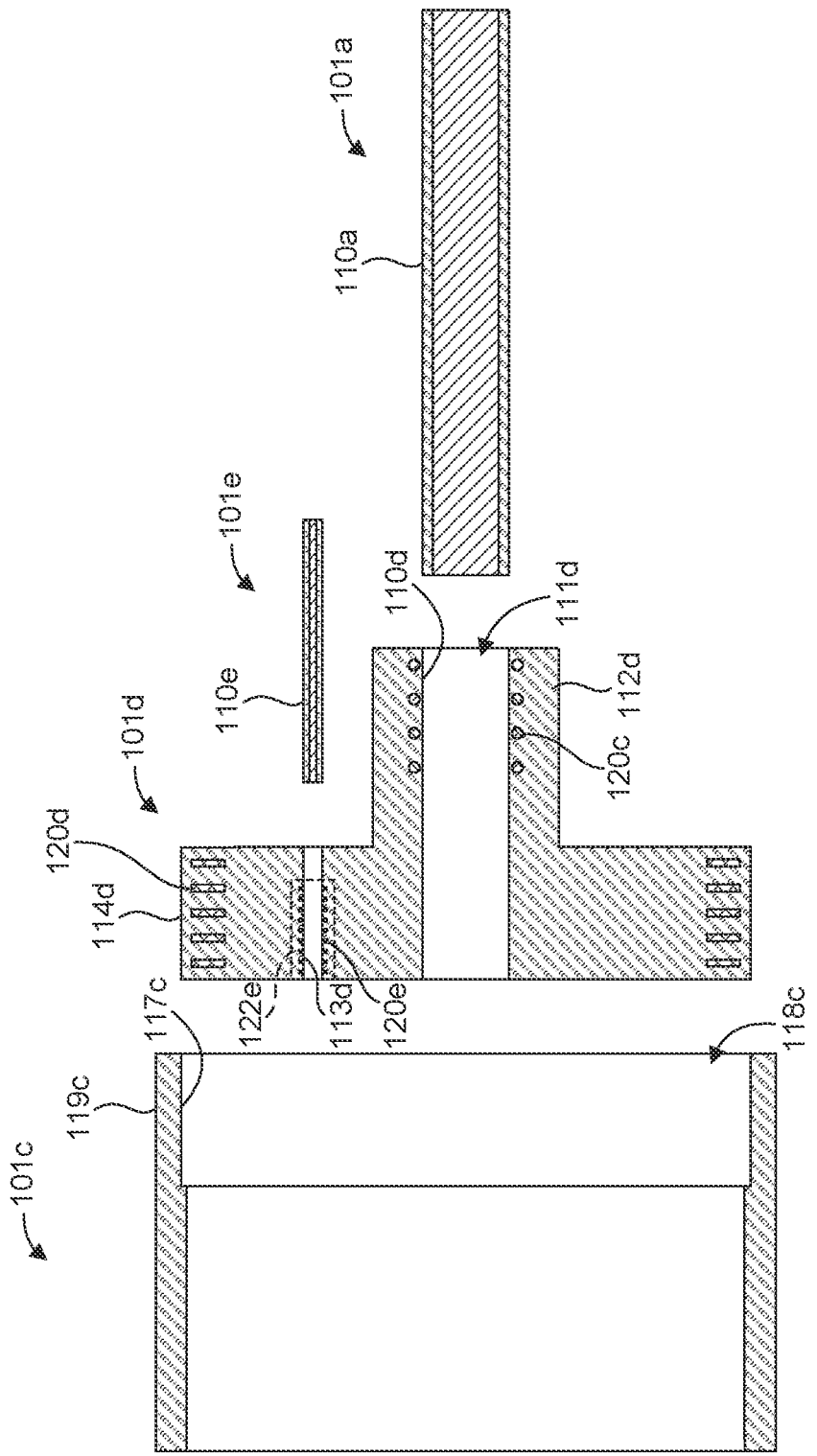

With reference to the exploded cross-section view of FIG. 4B, the components 101a, 101d include features that can be utilized or configured to facilitate coupling with one another. As mentioned above, the component 101a can have the coupling portion 110a, which in the case of a cable can be any suitable portion of the outer surface of the cable (e.g., a cable jacket). The component 101d (e.g., an end cap in the illustrated example) can have a coupling portion 110d configured to mate, interface, or otherwise facilitate coupling the component 101d with the outer surface coupling portion 110a of the cable 101a. The coupling portion 110d can include an opening 111d formed in and defined by a flange 112d of the component 101d. In one aspect, the outer surface coupling portion 110a of the component 101a can be configured to fit within the opening 111d. Stated differently, the opening 111d can be configured to receive the outer surface coupling portion 110a of the component 101a. In this case, the component 101a extends through the component v101d. In the illustrated example, the coupling portions 110a, 110d each have a cylindrical configuration, although this is not intended to be limiting, as any suitable configuration or geometry can be utilized.

The component assembly 100 can also include one or more susceptors 120c proximate the coupling portions 110a, 110d (e.g., embedded close to the joint interface). As described above, the susceptors 120c can be operable to convert electromagnetic energy (e.g., radio frequency (RF), magnetic fields, etc.) to heat sufficient to melt the coupling portions 110a, 110d at the joint interface, such that a solidified portion (indicated at 104c in FIG. 3) of the coupling portions 110a, 110d about the susceptor 120c couples the components 101a, 101d to one another.

In some examples, such as the example illustrated in FIGS. 3 and 4B, the susceptor 120c can be associated with a component, such as the component 101d in the illustrated example. For example, the susceptor 120c can be at least partially surrounded by or encapsulated (e.g., molded) in the material of the component 101d proximate to the coupling portion 110d. In this case, the coupling portion 110d can be configured to interface with the coupling portion 110a, In this example, therefore, the coupling portion 110d of the component 101d can be configured to interface directly with the outer surface coupling portion 110a of the component 101a.

The components 101c, 101d can also include features that can be utilized or configured to facilitate coupling with one another. For example, the component 101d can have a coupling portion 114d. The component 101c (e.g., shell) can have a coupling portion 117c configured to mate, interface, or otherwise facilitate coupling with the coupling portion 114d of the component 101b (e.g., end cap) for coupling the component 101d and the component 101c to one another. The coupling portion 117c can include an opening 118c formed in and defined by a flange 119c. In one aspect, the coupling portion 114d of the component 101d can be configured to fit within the opening 118c. Stated differently, the opening 118c can be configured to receive the coupling portion 114d of the component 101d. In the illustrated example, the coupling portions 114c, 110d each have a cylindrical configuration, although this is not intended to be limiting, as any suitable configuration or geometry can be utilized.

The component assembly 100 can also include one or more susceptors 120d proximate the coupling portions 114d, 117c (e.g., embedded close to the joint interface). As described above, the susceptors 120d can be operable to convert electromagnetic energy (e.g., radio frequency (RF), magnetic fields, etc.) to heat sufficient to melt the coupling portions 114d, 117c at the joint interface, such that a solidified portion (indicated at 104d in FIG. 3) of the coupling portions 114d, 117c about the susceptor 120d couples the components 101c, 101d to one another.

In some examples, such as the example illustrated in FIGS. 3 and 4B, the susceptor 120d can be associated with a component, such as the component 101d in the illustrated example. For example, the susceptor 120d can be at least partially surrounded by or encapsulated (e.g., molded) in the material of the component 101d proximate to the coupling portion 114d. In this case, the coupling portion 114d can be configured to interface with the coupling portion 117c, In this example, therefore, the coupling portion 114d of the component 101d can be configured to interface directly with the coupling portion 117c of the component 101c.

In one aspect, mentioned above, the component 101d, comprising an end cap in this example, can be configured to provide access for a feedthrough 101e (e.g., for communication and/or power) through the protective housing or barrier formed by the components 101b-d to the device 103 (e.g., an electronic device) located within the protective housing or barrier. The components 101d, 101e include features that can be utilized or configured to facilitate coupling with one another. The feedthrough 101e can have any suitable configuration. In some examples, the feedthrough 101e can comprise a cable. The feedthrough 101e can have a coupling portion 110e, which in the case of a cable can be any suitable portion of the outer surface of a cable (e.g., a cable jacket). The component 101d (e.g., end cap) can have a coupling portion 113d as described herein configured to mate, interface, or otherwise facilitate coupling the component 101d with the outer surface coupling portion 110e of the feedthrough 101e, In this case, the feedthrough 101e extends through the end cap 101d. In the illustrated example, the coupling portions 110d, 110e each have a cylindrical configuration, although this is not intended to be limiting, as any suitable configuration or geometry can be utilized.

The component assembly 100 can also include one or more susceptors 120e proximate the coupling portions 113d, 110e (e.g., embedded close to the joint interface). As described above, the susceptors 120e can be operable to convert electromagnetic energy (e.g., radio frequency (RF), magnetic fields, etc.) to heat sufficient to melt the coupling portions 113d, 110e at the joint interface, such that a solidified portion (indicated at 104e in FIG. 3) of the coupling portions 113d, 110e about the susceptor 120e couples the components 101d, 101e to one another. It should also be recognized that the susceptors 120e can optionally be included in a susceptor grommet 122e as described herein to facilitate coupling the components 101d, 101e to one another.

The components 101a-e, and more particularly the coupling portions 110a-e, can be formed or constructed in any suitable manner utilizing any suitable material for the intended purpose as described herein. For example, the components 101a, 101b (e.g., the coupling portions 110a-e) can comprise a polymeric material, such as a thermoplastic material (e.g., polyethylene (PE), polyetheretherketone (PEEK), polyetherketoneketone (PEKK), polyolefin, etc.). In some examples, the material of adjacent or mating components is the same. In other examples, the materials of adjacent or mating components can be different (e.g., different thermoplastic materials), which may be selected for their suitability in fusing or welding to one another, as described in more detail below.

Typically, the susceptor 120a-e will be made of a metallic material, a ferromagnetic material, and/or a dielectric material. In one aspect, the susceptor 120a-c can have high resistivity, which may be advantageous for induction heating. Suitable susceptor materials can include steel (e.g., ferritic steel, stainless steel (e.g., ferritic stainless steel), etc.), copper, aluminum, molybdenum, niobium, silicon carbide, graphite, etc. In some cases where the component assembly 100 will be used in a water environment, stainless steel may be preferred as a susceptor material for its corrosion resistance properties in the event the susceptor is exposed to water.

The susceptor(s) 120a-e can have any suitable configuration, geometry, or construction known in the art. In one aspect, the susceptor(s) 120a-e can comprise a ring or hoop configuration and/or a coil configuration, as shown in FIGS. 3-4B. In another example, the susceptor(s) 120a-e can comprise a ball configuration. A cross-sectional shape of a ring, hoop, or coil can be of any suitable shape or geometry, such as a circular shape a rounded shape, a rectangular shape, a triangular shape, etc. In another aspect, the susceptor(s) 120a-e can be a particulate or a powder, which can be formed or molded into or otherwise supported by a polymeric material.

FIG. 3 further illustrates a component coupling system 105 in accordance with an example of the present disclosure. For example, the coupling system 105 can include one or more electromagnetic energy sources 130a-c, such as an inductor (e.g., PE welder), to generate an electromagnetic (e.g., RF or magnetic) field and apply this to or about select portions or regions of the component assembly 100 to produce a localized welded region.

In one aspect, the electromagnetic energy sources 130a-c can be configured to radiate energy directed toward the susceptors 120a-e to weld or fuse the adjacent components 101a-e to one another by heating the susceptors 120a-e. In a particular aspect, the electromagnetic energy sources 130a, 130b can be configured to include an inductor coil, and the components 101a-d can fit within the coil without contacting the electromagnetic energy sources 130a, 130b, such that energy (e.g., a magnetic field or flux) is radiated radially inward to heat the susceptors 120a-d. The electromagnetic energy source 130c can include an inductor coil configured to direct energy (e.g., a magnetic field or flux) longitudinally along the cable 101e to heat the susceptor 120e within the component 101d without the electromagnetic energy source 130c contacting the component 101e or the component 101d. The intensity, duration, and/or location of the radiation or magnetic field can be tightly controlled to provide repeatable results. Each of the electromagnetic energy sources 130a-c can be configured to provide focused induction heating. In other words, the electromagnetic energy sources 130a-c can be configured to deliver localized, focused electromagnetic energy, meaning only the energy required to one or more specific locations or regions of the component assembly 100 in each of the radial and longitudinal directions (e.g., in the event of a circular component assembly, such as a cable or cable junction) to achieve one or more specific, localized fused or welded regions within the component assembly 100, and to avoid undesirable interactions with other components that may be located in or around the assembly (e.g., metal components of an electronic device, pressure vessel, etc.). Indeed, the electromagnetic energy can be delivered so as to produce a welded or fused region confined to a specific boundary about the susceptors. For example, the electromagnetic energy source can be controlled to deliver electromagnetic energy to a specific radial depth (e.g., about 25 mm+/−1-2 mm) and along a specific axial length (e.g., about 25-50 mm+/−1-4 mm) about the susceptors 120a-d, such that the component assembly 100 comprises one or more fused or welded regions having a specific depth and axial length sufficient to join the components of the component assembly 100 together. Material selections, thickness, and related composition, such as resistivity and conductivity, and/or other characteristics may also be taken into consideration. The joining structures and techniques disclosed herein can rapidly produce an assembly 100 that provides a high-pressure, watertight seal in much less time than standard injection molding technology. In one aspect, the principles disclosed herein can also be used for non-sealing, mechanical fastening purposes.

In accordance with one embodiment of the present invention, a method of coupling polymeric components utilizing localized, focused electromagnetic energy is disclosed. The method can comprise obtaining a first component having a first coupling portion, a second component having a second coupling portion, and a susceptor. The method can also comprise mating the first and second components such that the susceptor is proximate the first and second coupling portions. Additionally, the method can comprise applying electromagnetic energy to the susceptor, wherein the susceptor converts the electromagnetic energy to heat, which melts portions of the first and second coupling portions about the susceptor to couple the first and second components to one another upon solidification. It is noted that no specific order is required in this method, though generally in one embodiment, these method steps can be carried out sequentially.

In one aspect of the method, the first coupling portion comprises an opening and the second coupling portion is configured to fit within the opening.

In one aspect of the method, the first coupling portion and the second coupling portion each have a cylindrical configuration.

In one aspect of the method, the susceptor comprises at least one of a ring configuration, a coil configuration, a particulate, or a powder.

In one aspect of the method, the susceptor comprises at least one of stainless steel, aluminum, molybdenum, niobium, silicon carbide, or graphite.

In one aspect of the method; electromagnetic energy is applied by an inductor.

In one aspect of the method, at least one of the first coupling portion or the second coupling portion is formed of a thermoplastic material.

In one aspect of the method, the components form at least a portion of a data cable assembly.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention, One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method of coupling polymeric components of a cable junction utilizing electromagnetic energy, comprising:
   obtaining a cable having a first coupling portion;
   obtaining an end cap having a second coupling portion, and
   obtaining a susceptor, wherein the susceptor is at least partially embedded within at least one of the first coupling portion or the second coupling portion;
   mating the cable with the end cap such that the susceptor is proximate the first and second coupling portions; and
   applying electromagnetic energy to the susceptor, wherein the susceptor converts the electromagnetic energy to heat, which melts portions of the first and second coupling portions about the susceptor to couple the cable and the end cap to one another upon solidification.

2. The method of claim 1, wherein the end cap further comprises a third coupling portion and the method further comprises:
   obtaining a shell having a fourth coupling portion;
   obtaining a second susceptor, wherein the second susceptor is at least partially embedded within at least one of the third coupling portion or the fourth coupling portion;
   mating the end cap with the shell such that the second susceptor is proximate the third and fourth coupling portions; and
   applying electromagnetic energy to the second susceptor, wherein the second susceptor converts the electromagnetic energy to heat, which melts portions of the third and fourth coupling portions about the second susceptor to couple the end cap and the shell to one another upon solidification.

3. The method of claim 2, wherein at least one of the first, second, third, or fourth coupling portions comprises a thermoplastic material.

4. The method of claim 3, wherein the thermoplastic material comprises at least one of polyethylene (PE), polyetheretherketone (PEEK), polyetherketoneketone (PEKK), or polyolefin.

5. The method of claim 2, wherein the cable has a fifth coupling portion and the shell has a sixth coupling portion, and the method further comprises:
   obtaining a second end cap having seventh and eighth coupling portions;
   obtaining a third susceptor, wherein the third susceptor is at least partially embedded within at least one of the fifth coupling portion or the seventh coupling portion;
   obtaining a fourth susceptor, wherein the fourth susceptor is at least partially embedded within at least one of the sixth coupling portion or the eighth coupling portion;
   applying electromagnetic energy to the third susceptor, wherein the third susceptor converts the electromagnetic energy to heat, which melts portions of the fifth and seventh coupling portions about the third susceptor to couple the cable and the second end cap to one another upon solidification; and applying electromagnetic energy to the fourth susceptor, wherein the fourth susceptor converts the electromagnetic energy to heat, which melts portions of the sixth and eighth coupling portions about the fourth susceptor to couple the shell and the second end cap to one another upon solidification.

6. The method of claim 2, wherein the end cap has a fifth coupling portion and the method further comprises:

obtaining a feedthrough having a sixth coupling portion; and obtaining a third susceptor, wherein the third susceptor is at least partially embedded within at least one of the fifth coupling portion or the sixth coupling portion;

applying electromagnetic energy to the third susceptor, wherein the third susceptor converts the electromagnetic energy to heat, which melts portions of the fifth and sixth coupling portions about the third susceptor to couple the feedthrough and the end cap to one another upon solidification.

7. The method of claim 1, wherein the first coupling portion comprises an opening and the second coupling portion is configured to fit within the opening.

8. The method of claim 1, wherein the first coupling portion and the second coupling portion each have a cylindrical configuration.

9. The method of claim 1, wherein the susceptor comprises at least one of a ring configuration, a coil configuration, a particulate, or a powder.

10. The method of claim 1, wherein the susceptor comprises at least one of stainless steel, aluminum, molybdenum, niobium, silicon carbide, or graphite.

11. The method of claim 1, wherein electromagnetic energy is applied by an inductor.

12. The method of claim 1, wherein at least one of the first coupling portion or the second coupling portion is formed of a thermoplastic material.

13. The method of claim 1, wherein the components form at least a portion of a data cable assembly.

* * * * *